(12) United States Patent
Djordjevic (10) Patent No.: US 7,815,780 B2
(45) Date of Patent: Oct. 19, 2010

(54) POOL CHLORINATOR CELL ULTRASONIC CLEANER

(75) Inventor: B. Boro Djordjevic, Severna Park, MD (US)

(73) Assignee: Materials and Sensors Technologies, Inc., Glen Burnie, MD (US)

( * ) Notice: Subject to any disclaimer, the term of this patent is extended or adjusted under 35 U.S.C. 154(b) by 987 days.

(21) Appl. No.: 10/957,937

(22) Filed: Oct. 4, 2004

(65) Prior Publication Data

US 2005/0077190 A1    Apr. 14, 2005

Related U.S. Application Data

(60) Provisional application No. 60/508,082, filed on Oct. 2, 2003.

(51) Int. Cl.
*C25B 9/00* (2006.01)
*C25B 1/26* (2006.01)
*C02F 1/467* (2006.01)

(52) U.S. Cl. ............... 204/273; 205/755; 210/748.2
(58) Field of Classification Search ............... None
See application file for complete search history.

(56) References Cited

U.S. PATENT DOCUMENTS

| | | | |
|---|---|---|---|
| 2,498,990 A * | 2/1950 | Fryklund | 340/388.3 |
| 3,301,535 A * | 1/1967 | Brown | 366/113 |
| 4,088,550 A | 5/1978 | Malkin | 205/341 |
| 4,127,467 A * | 11/1978 | Smith | 204/272 |
| 4,248,715 A | 2/1981 | Olivier | 204/260 |
| 5,439,566 A * | 8/1995 | Zucker | 205/744 |
| 5,665,141 A * | 9/1997 | Vago | 95/30 |
| 6,391,167 B1 | 5/2002 | Grannersberger | 204/228.3 |

FOREIGN PATENT DOCUMENTS

| JP | 2003-024943 A | | 1/2003 |
|---|---|---|---|
| JP | 2003-024943 A | * | 1/2003 |

* cited by examiner

*Primary Examiner*—Harry D Wilkins, III
(74) *Attorney, Agent, or Firm*—Pepper Hamilton LLP (57) ABSTRACT

A device for removing mineral deposits from the electrode of a pool chlorinator cell, which has a housing with liquid inlet and outlet ports and in which the electrode is submerged, has: (a) a container having an opening, with this opening being affixed proximate an aperture that is placed in the housing, (b) an ultrasonic membrane which covers the aperture, (c) an ultrasonic transducer mounted in the container and coupled to the membrane in such a manner so as to cause specified, ultrasonic vibrations in the membrane and throughout the liquid contained in the housing, and (d) a frequency modulated power source that drives the transducer. In a preferred embodiment, this device is powered such that the energy projected to the electrodes is in range of 100 to 200 watts and the flux of energy supplied to the membrane is in the range of 4 to 25 watts per square inch of membrane surface area.

35 Claims, 10 Drawing Sheets

POOL CHLORINATOR CELL ULTRASONIC CLEANER

CROSS-REFERENCE TO RELATED APPLICATION

This application claims the benefit of U.S. Provisional Patent Application No. 60/508,082, filed Oct. 2, 2003 by B. Boro Djordjevic.

BACKGROUND OF THE INVENTION

1. Field of the Invention

This invention generally relates to the maintenance and prevention of mineral deposit accumulations on electrodes which are submerged in the chemical baths of electrolytic cells. More particularly, this invention relates to an apparatus and process that uses ultrasonic cleaning to remove mineral deposits that can accumulate on the electrodes of pool chlorination cells.

2. Description of the Related Art

The maintenance of swimming pools, especially in regard to the chemistry of the pool's water, can be a complex, time-consuming and expensive routine. For fresh-water pools, this usually involves, especially during the warmer season, checking the pool's water almost daily to determine and maintain its pH level and chlorine content. Unless these factors are carefully controlled, the growth of bacteria and algae in the pool will be excessive with the result that the pool water may pose a health hazard. In addition, the surfaces of the pool may become discolored and unsightly if the water's chemistry is not controlled.

To maintain fresh-water pools, frequent addition of acid and chlorine, typically in the form of sodium hypochlorite, is required. These acid and chlorine addition steps can be expensive and time consuming for the average pool owner.

For pools that use water having a slight salt content (i.e., much less than seawater, and only about half the content found in human tears), or salt-water pools, the maintenance of the water's chemistry can be a much easier task due to the development of various automated systems, especially the pool chlorinator cell or the electrolytic chlorination system.

This system introduces into the pool's water circulation system an electrolysis or chlorinator cell that uses the water's salt (NaCl) to produce locally elevated concentrations near the cell's electrodes of chlorine (i.e., actually hypochloride which is generated via local pole chemistry) which acts to kill any algae or bacterial in the water that flows through the chlorinator cell. While such systems are generally easy to operate, they can occasionally suffer from maintenance problems associated with mineral deposit accumulations on the cell's electrodes.

Maintenance of such chlorinator cells usually involve the cell's periodic removal, disassemble and cleaning in an acid bath solution. Such cells must be regularly monitored and inspected for deposit accumulations on the electrodes. These maintenance problems can present a drawback to the greater use of such cells in the pool industry.

Prior attempts to resolve this chlorinator cell maintenance problem have provided only limited successes. For example, means for cleaning pool chlorination cells are disclosed in U.S. Pat. Nos. 6,391,167 and 4,088,550 and involve polarity changes to drive the cell's electrodes. However, this approach does not completely eliminate the deposition problem, and it mandates coating on all cell electrodes. Additionally, failure of cells maintained in this manner has reportedly resulted from erosion of the cell coating.

Although ultrasonic cleaners have been used in a variety of cleaning applications (from cleaning jewelry and medical equipment to micro circuitry and spacecraft parts), they have yet to be effectively used to address the problems associated with the maintenance of submerged electrodes.

Despite the prior art, there still exists a continuing need for improvements in the design of processes and apparatus to maintain submerged electrodes, including those found in pool chlorination cells.

3. Objects and Advantages

There has been summarized above, rather broadly, the prior art that is related to the present invention in order that the context of the present invention may be better understood and appreciated. In this regard, it is instructive to also consider the objects and advantages of the present invention.

It is an object of the present invention to provide an improved method of cleaning the mineral accumulated deposits on submerged electrodes, especially those used in pool chlorinator cells.

It is another object of the present invention to provide for the in-situ, maintenance-free cleaning of pool chlorination cell electrodes; thus minimizing maintenance inspection and labor costs for pool chlorination systems.

It is an object of the present invention to provide an improved method of preventing the mineral accumulation and deposits on submerged electrodes, especially those used in pool chlorinator cells.

It is yet another object of the present invention to minimize the service and cell cleaning operations associated with the use of pool chlorination systems, regardless of the size and power of such systems.

It is a further object of the present invention to provide a method and apparatus that cleans pool chlorination cell electrodes without the use of chemicals, such as acids, and without needing to disassemble the cell's housing.

It is a still further object of the present invention to provide methodology for automatically maintaining and cleaning pool chlorinator cell electrodes, especially as it relates to preventing end removing the calcium carbonate that is commonly formed on chlorinator cell electrode surfaces.

These and other objects and advantages of the present invention will become readily apparent as the invention is better understood by reference to the accompanying summary, drawings and the detailed description that follows.

SUMMARY OF THE INVENTION

Recognizing the need for the development of improved methods and apparatus for cleaning submerged electrodes, especially those found in pool chlorination cells, the present invention is generally directed to satisfying the needs set forth above and overcoming the disadvantages identified with prior art devices and methods.

In accordance with the present invention, the foregoing need can be satisfied by providing a device for preventing the deposition of mineral deposits on and causing the removal of mineral deposits from the electrode of a pool chlorinator cell having a housing with liquid inlet and outlet ports and in which the electrode is submerged. Such a device has: (a) a container having an opening, with this opening being affixed proximate an aperture that is placed in the housing, (b) an ultrasonic membrane which covers the aperture, (c) an ultrasonic, high power transducer mounted in the container and coupled to the membrane in such a manner so as to cause specified, ultrasonic vibrations in the membrane and throughout the liquid contained in the housing, and (d) a frequency modulated power source that drives the transducer.

In a first preferred embodiment, this device projects 100 to 200 watts of acoustical energy over the electrodes immersed in a cell housing.

In a second preferred embodiment, this device is powered such that the flux of energy supplied to the membrane is in the range of 4 to 25 watts per square inch of membrane surface area.

Thus, there has been summarized above, rather broadly, the present invention in order that the detailed description that follows may be better understood and appreciated. There are, of course, additional features of the invention that will be described hereinafter and which will form the subject matter of the claims to this invention.

DESCRIPTION OF THE PREFERRED EMBODIMENT

Before explaining at least one embodiment of the present invention in detail, it is to be understood that the invention is not limited in its application to the details of construction and to the arrangements of the components set forth in the following description or illustrated in the drawings. The invention is capable of other embodiments and of being practiced and carried out in various ways. For example, the preferred embodiments disclosed herein are directed to cleaning and removal of mineral deposits on pool chlorinator cells, but can be applied to other systems that use submerged electrodes which are prone to mineral deposit buildups.

Also, it is to be understood that the phraseology and terminology employed herein are for the purpose of description and should not be regarded as limiting.

Furthermore, it should be recognized that the geometry and location of the electrodes and cell shapes described herein can vary dependent on their applications, design freedoms, aesthetic preferences and location factors. For example, the ultrasonic generation membrane and transducers can be located on the bottom or sides of the cell housing with radial or axial orientations to the cell. Furthermore, these ultrasonic membrane can be made of many materials, including stainless steel, titanium, plastic materials, or plastic coated and corrosion protected metals.

Figure 1:
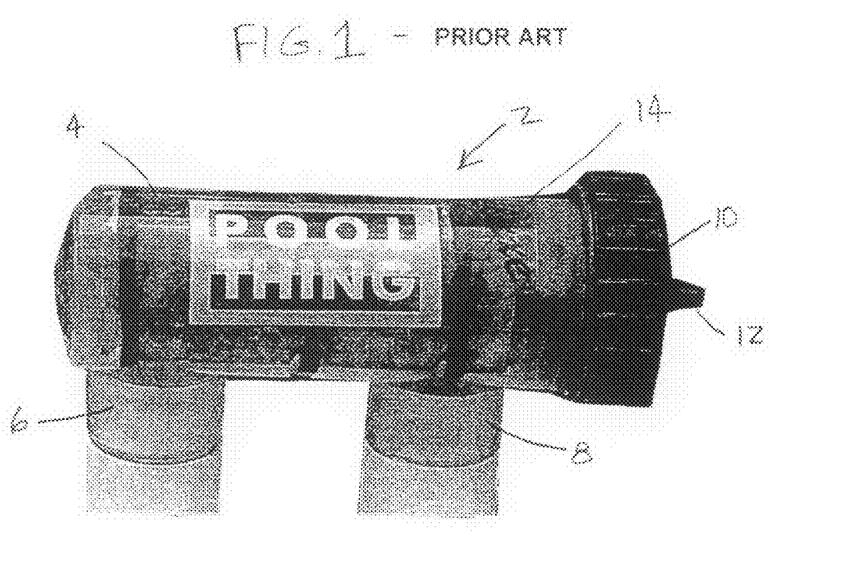
FIG. 1 illustrates the housing of the typical pool chlorinator cell.
Figure 2:
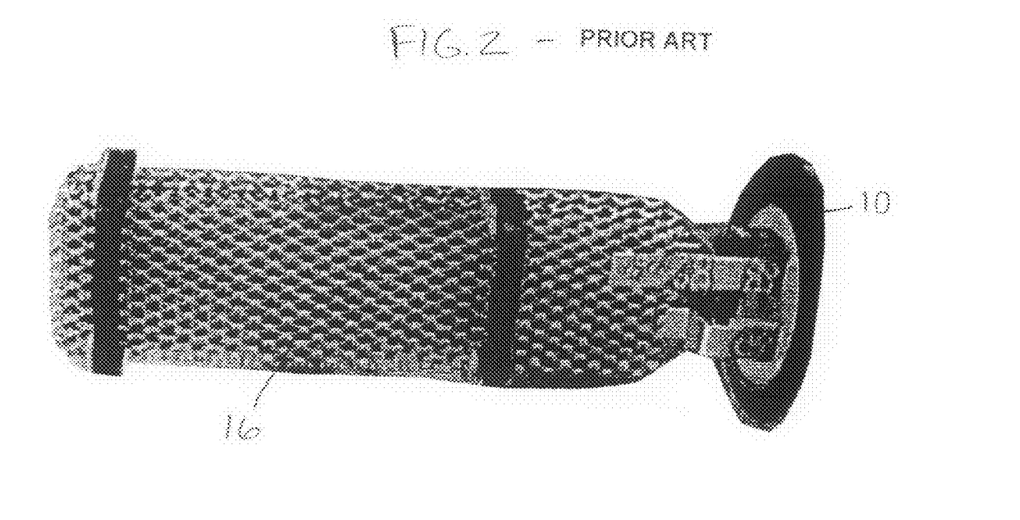
FIG. 2 shows the chlorinator cell's mesh-type electrode assembly removed from the cell's housing (note: other cells may use solid plate or other geometrical designs for the electrode).
Figure 3:
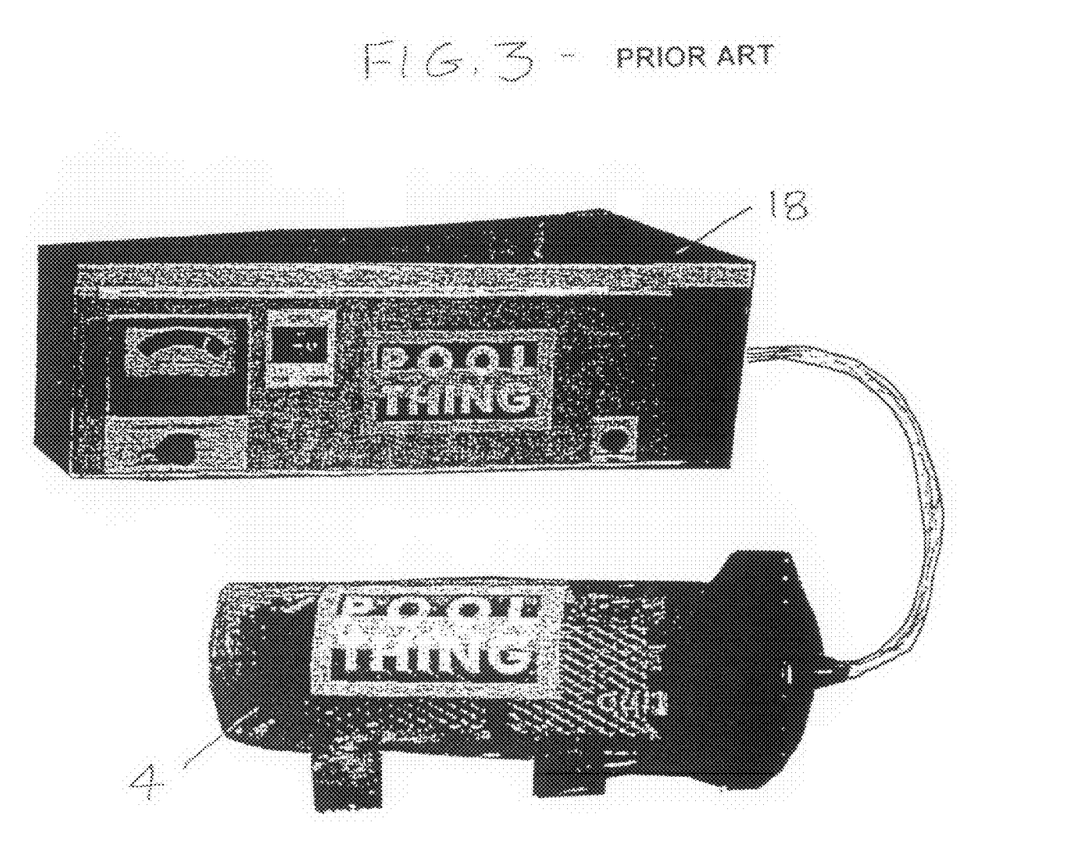
FIG. 3 illustrates typical housing and power supply for a pool chlorinator cell.

The typical pool chlorinator cell 2, which uses the trade name "POOL THING ®," on which the present invention is applied is shown in FIGS. 1-3. FIG. 1 shows the housing 4 of such a cell 2. This housing is seen to have water inlet 6 and outlet 8 ports in its lower surface and an end cap 10 that provides entry for an electrical connector 12 to mate with the cell's electrode 14 that is sealed within this housing.

FIG. 2 shows the cell's mesh-type electrode assembly 16 removed from the cell's housing 4 (note: other cells may use solid plate or other geometrical designs for the electrode). FIG. 3 shows both the cell's housing 4 and the power supply 18 for the cell's electrode 14.

To prevent the attachment of and to cause the removal of mineral deposits that can accumulate on the electrodes of such cells, I have discovered that the housing 4 of this cell can be modified to include an ultrasonic cleaning device 20 that excellently performs the required cleaning task.

The cleaning and inhibition of the deposition is achieved by projecting high power ultrasound at the cell electrodes. This sound beam creates creeping acoustical stress waves along surface of the electrodes, thereby inhibiting the deposition of the minerals. Furthermore, high intensity of the ultrasonic waves creates the phenomena of localized cavitation near the electrode surface; this phenomena has proven to be essential in removing any accumulation of deposits. In addition, the gas bubbles which are generated by such chlorination cells are observed to be dynamically excited, enlarged or collapsed by the sound, thereby providing further dynamical disturbances in the proximity of the electrode surface that contributes to removal of the accumulated mineral deposits.

This device can be designed to operate either continuously or intermittently for a cell that is filled with water or a cell that has water flowing through it. Thus, this device is suitable for automated operation to yield truly maintenance-free operation of such cells. Additionally, it involves no additional chemicals and does not require the disassembly of the cell 2.

The device 20 of the present invention has been found to be capable of multi-year, service-free operation. Furthermore, it has been designed to be easily integrated into the cell's present installation configuration and, consequently, can be easily retrofitted into existing chlorinator cell assemblies.

Figure 4A:
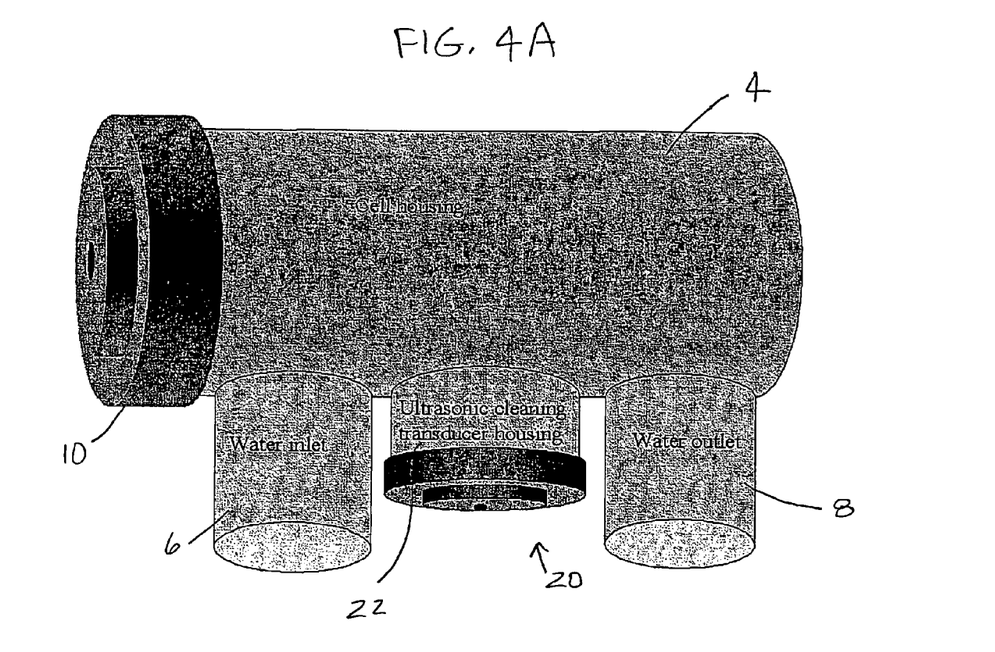
FIGS. 4A-4B illustrate a preferred embodiment for a protrusion to the standard pool chlorinator housing which accommodates the ultrasonic cleaning transducer of the present invention.
Figure 4B:
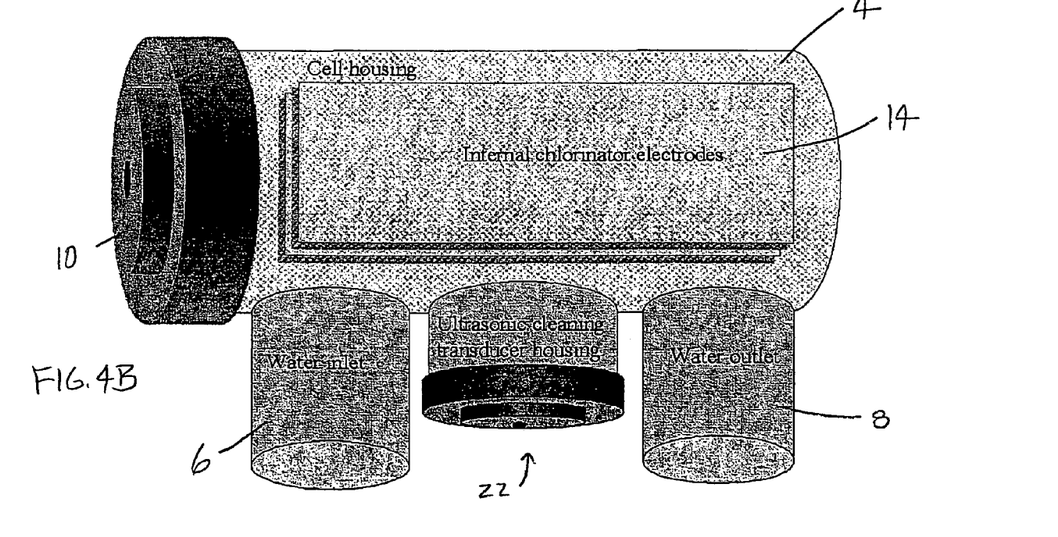

FIGS. 4A-4B illustrate a preferred embodiment of a standard cell housing 4 that has been modified (i.e., by the introduction of an aperture 11 in the bottom of the housing) to accommodate a single protrusion or container 22 (i.e., the container has an opening 21 which mates with the housing's aperture 11) that houses the ultrasonic generation means of the present invention, i.e., a membrane 24 that is coupled to a piezoelectric or ultrasonic cleaning transducer 26. This same protrusion 22 also can contain the electrical circuits 28 that drive the transducer 26, or the necessary electrical signal can be supplied by appropriate electrical cables that connect to the electrical circuits which are remotely located.

Figure 5:
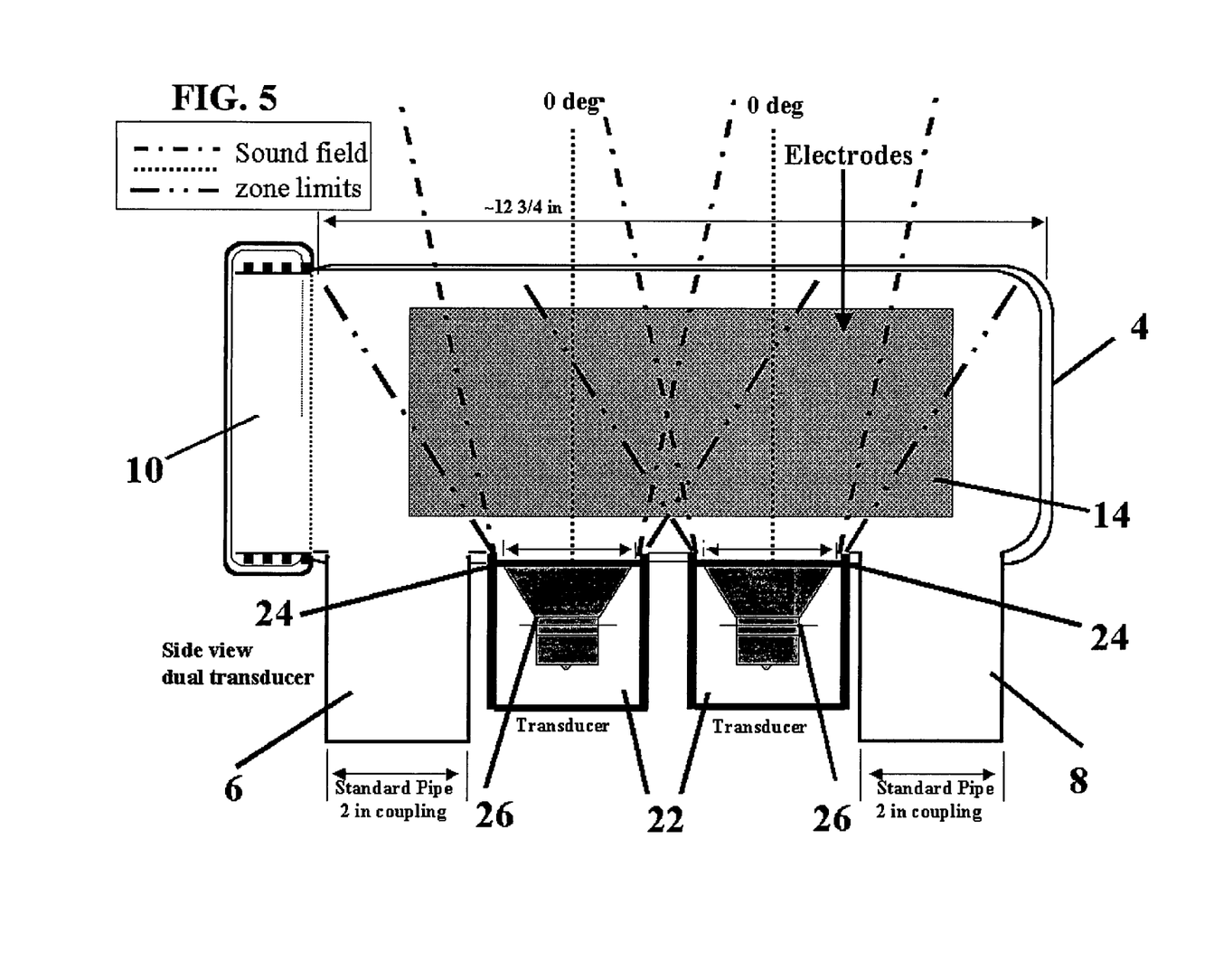
FIG. 5 illustrates the orientation of the transducer housings of the present invention in an embodiment which utilizes two transducers to generate desired insonification zones for better coverage of the electrode surfaces.

Meanwhile, FIG. 5 illustrates the orientation of such transducers using an existing housing in an embodiment which utilizes two protrusions 22 and their accompanying transducers 26 and membranes 24 to generate a higher intensity, insonification zone that covers a larger volume of cell electrodes.

The present invention achieves its ultrasonic cleaning of the cell's electrode by integrally introducing its ultrasonic generation elements into the cell and powering them so as to achieve insonification of the cell's electrodes.

For cells such as that shown in FIGS. 1-3 which have cylindrical housings and are approximately 6 inches in diameter and 12 inches long, it has been found sufficient power to create the desired cleaning effect on their sealed electrode is provided by using generally 20 to 50 kHz signals at power levels of 50 to 300 watts, with preferred power levels being in the range of 100 to 200 watts per transducer, wherein a 3-5 inch diameter membrane is coupled to the transducer. This equates to an energy flux in the range of 4 to 25 watts per square inch of membrane surface area.

The frequency and power of the necessary insonification field has been found to be a function of: (a) the size of the housing, (b) the size of the enclosed electrode, and (c) the overall geometry and configuration of a specific chlorination cell. In the development of the present invention, it was found to be important to size the coupling membrane 24 according to the size of the cell 2 and its electrodes 14, and to locate a sufficient number of ultrasonic sources or transducers 22 so as to achieve the desired uniform electrode cleaning throughout the cell.

Additionally, it is necessary to provide in the ultrasonic r.f. drive some center frequency modulation so as to remove the effect of standing waves that are noted to exist in the cell's housing. Further, shaping of the cell walls (geometrically and in thickness) were found to improve the direction and distribution of the ultrasonic energy in the cell for enhanced cleaning efficiency. It was further found to be advisable to adapt and program the present invention's power source so as to provide continuous lower power insonification to inhibit depositions and, as needed, to intermittently introduce higher power levels for the cleaning and removal of stubborn mineral deposits.

Figure 6A:
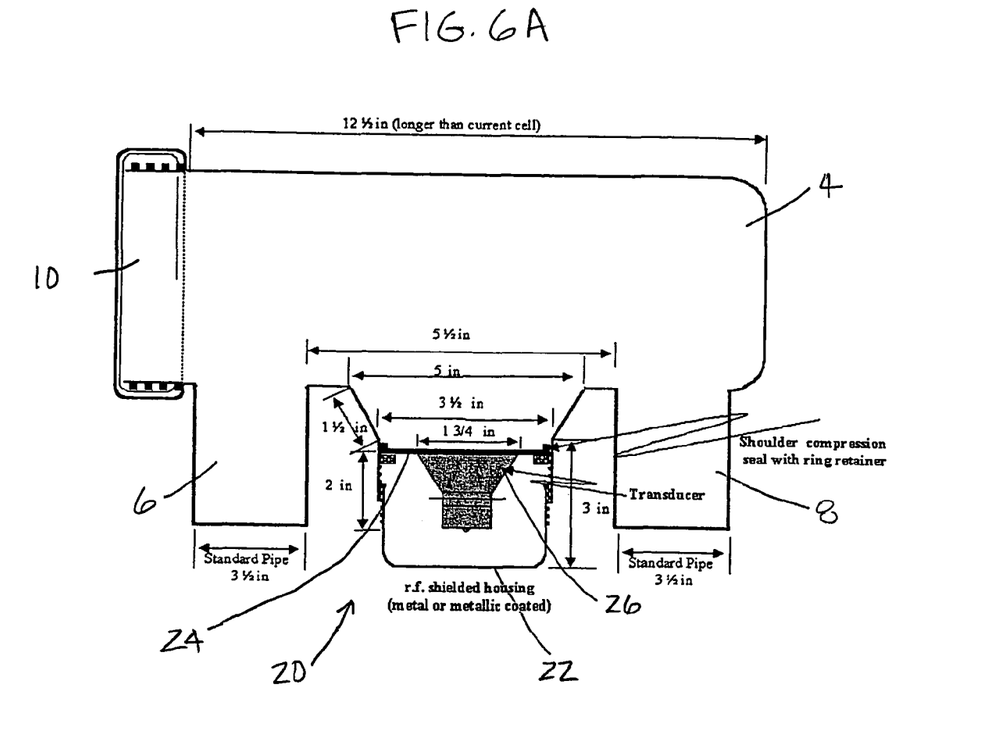
FIGS. 6A-6B show respective side and top views of a single transducer version of the present invention.
Figure 6B:
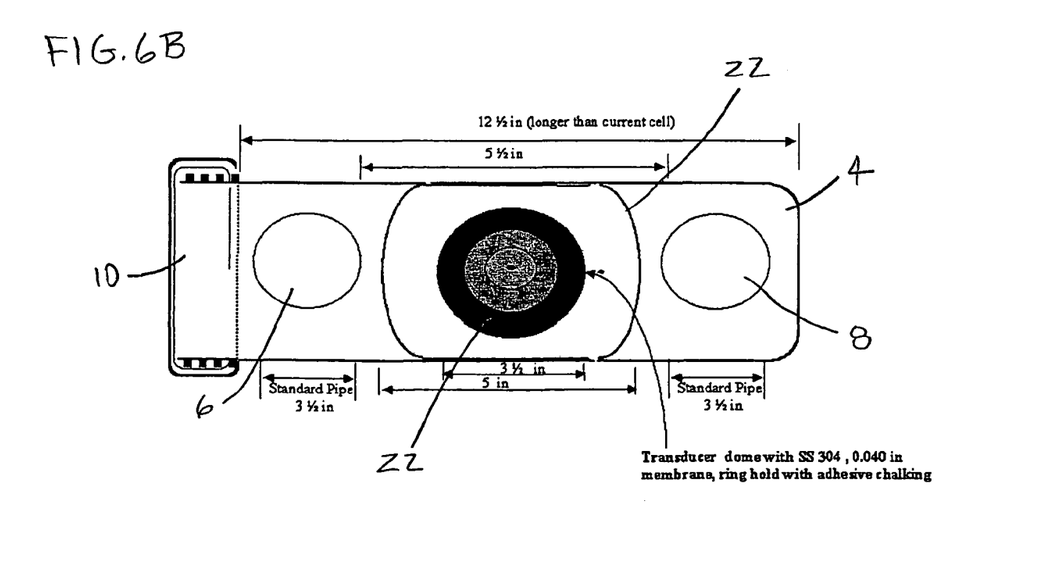

As examples of the manner by which the present invention may be constructed, there follows a description for constructing preferred embodiments of the present invention which is fitted to a specific pool chlorinator cells 2:

(a) A chlorination cell 2 (approximately 12.5 inches in length and 6 inches in diameter) is modified to include a protrusion that encloses an ultrasonic transducer 26 and its coupled membranes 24. These are located at appropriate geometries so as to project ultrasound over the full volume of the cell's electrodes assembly. See FIGS. 6A-6B. The ultrasonic transducer 26 is mounted beneath a membrane or dome (e.g., 0.04 inch thick 304 stainless steel) that is incorporated into the cell housing. The membrane couples and radiates sound energy into the liquid flowing through the cell. The high power ultrasonic transducer 26 which is schematically shown in FIG. 6A is impedance matched to the membrane and is housed in the r.f. shielded container 22 to eliminate EMF radiation to the surrounding environment. The drive signal to the transducer is delivered via shielded cables from the electronic r.f. signal/power source. The power source can be mounted either adjacent to the membrane or remote from the cell. An electronic control assembly and power supply, which has a controlled frequency source and amplifiers, provides between 100 to 200 watts of electrical energy to the transducer. This acoustical energy is directed towards the electrodes via coupling membrane 24.

Figure 7A:
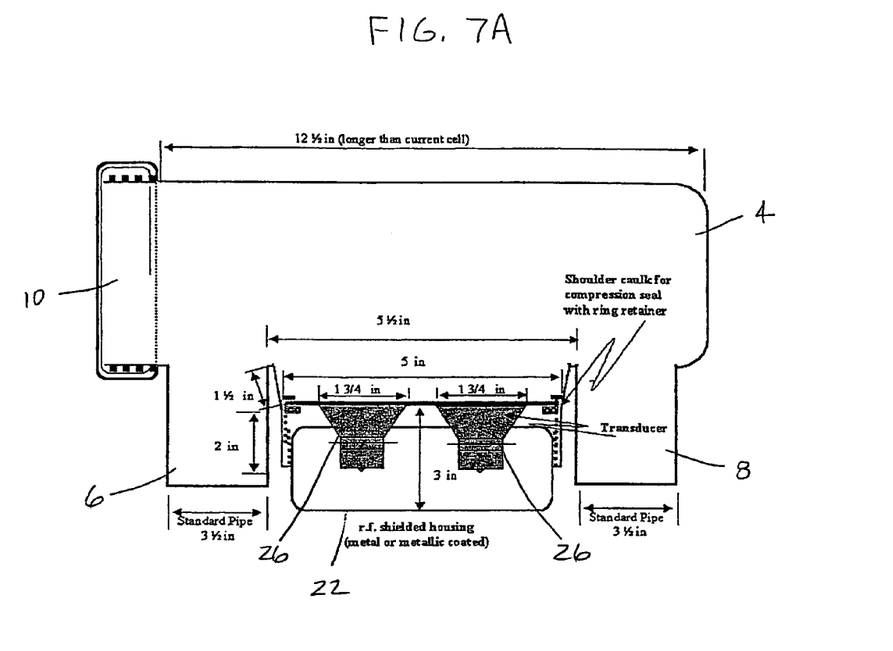
FIGS. 7A-7B show respective side and top views of a two transducer version of the present invention.
Figure 7B:
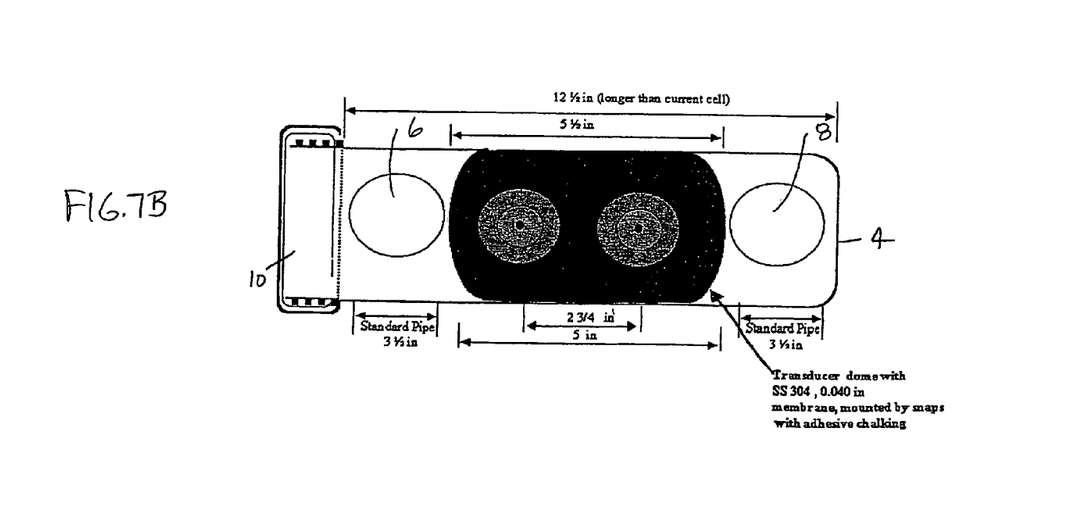
Figure 7C:
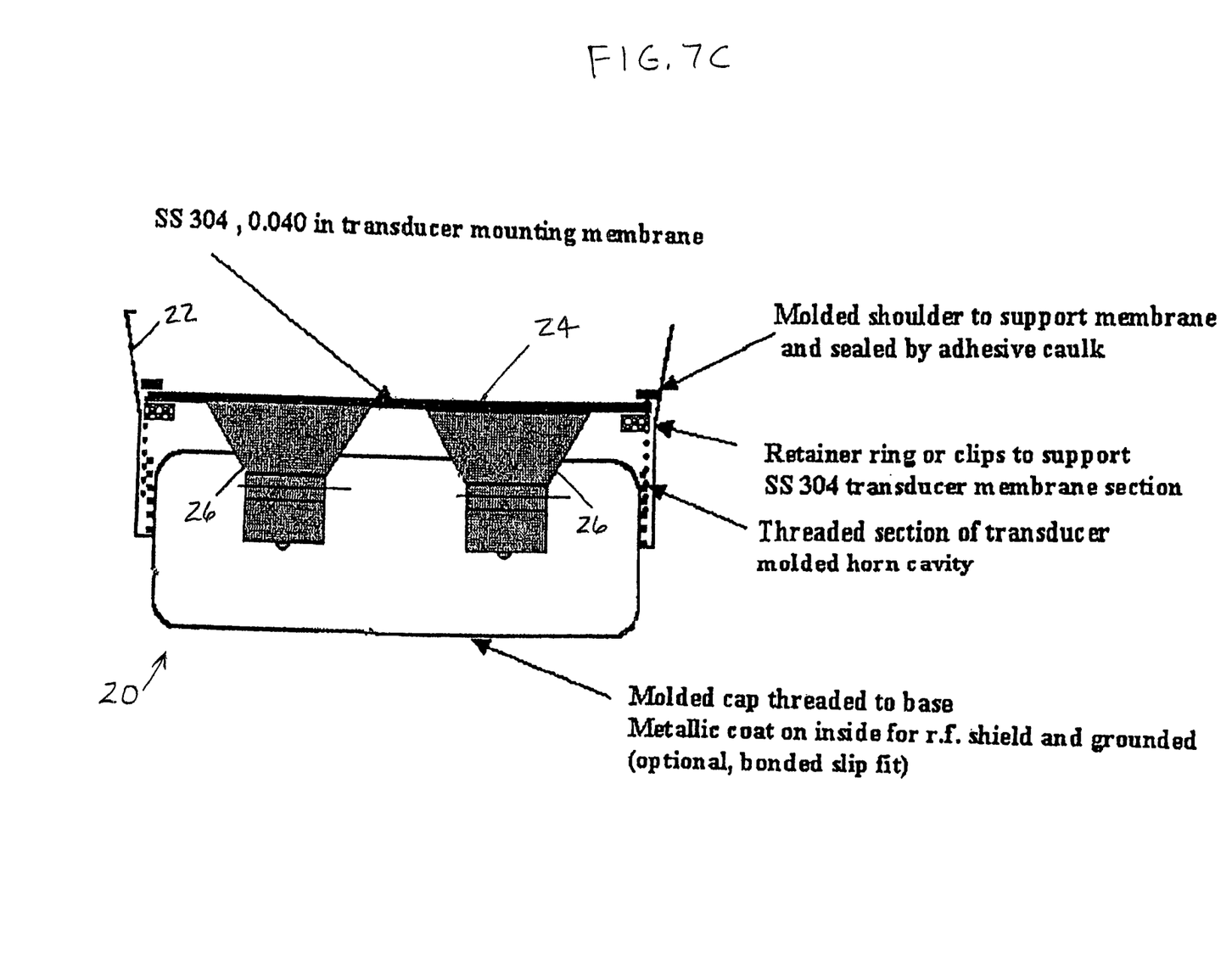
FIG. 7C shows the mounting details for the transducer housing/cavity of a two transducer version of the present invention.
Figure 8:
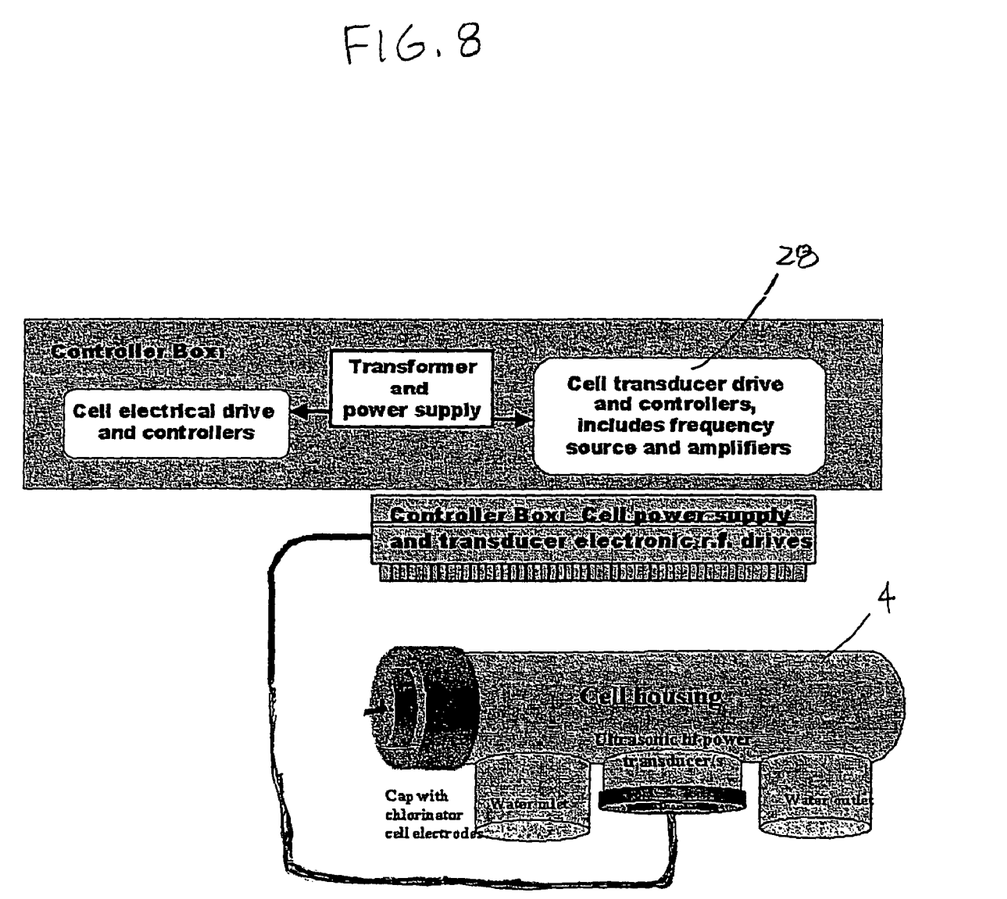
FIG. 8 shows a system schematic for a single transducer version of the present invention including its controller for the transducer's drive system.

(b) FIGS. 7A-7C illustrate the arrangement of a two transducer embodiment of the present invention into a cell 2 having a larger size housing 4. This embodiment also includes sensors that are attached to the cell or interfaced to cell's electronics controller. These sensors' outputs are used to control the transducer's power supply. By sensing the presence of liquid in the cell and the on-off operation of the cell's electrodes, this signal is used to switch off the transducer's power supply when liquid is not in the cell or liquid is not flowing through the cell. A control box, as shown in FIG. 8, which as has programmable timers and power level controls is used to control the operation of the transducer. These electrical and transduction components may be mounted separately or integral to the cell housing and can be of different designs with preferred configuration using modern solid state devices and can be packaged to support one or many ultrasonic transducer drives.

Figure 9A:
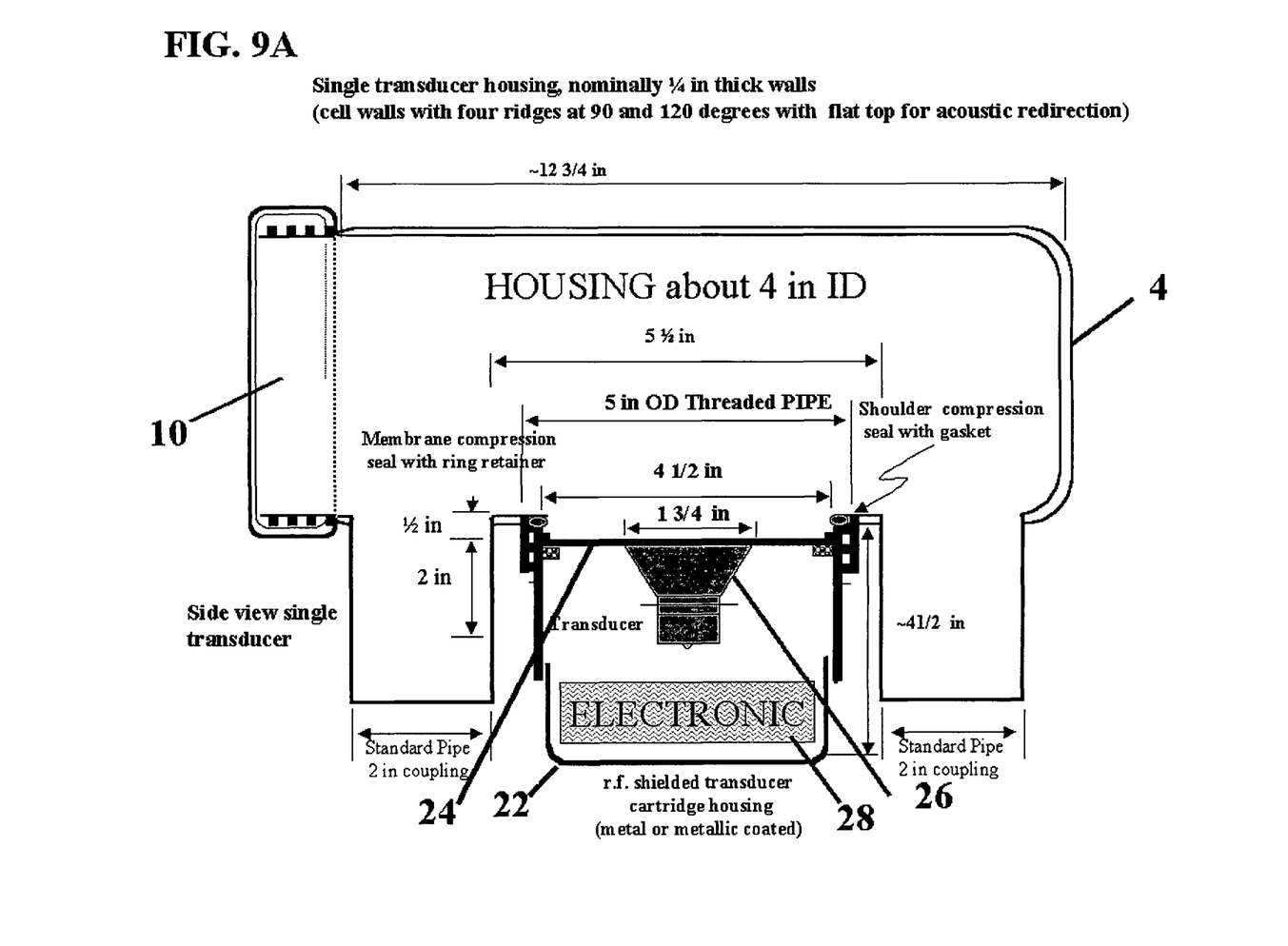
FIGS. 9A-9B show respective side and top views of a single transducer version of the present invention in which the electronics for the transducer have been included within the devices' container.
Figure 9B:
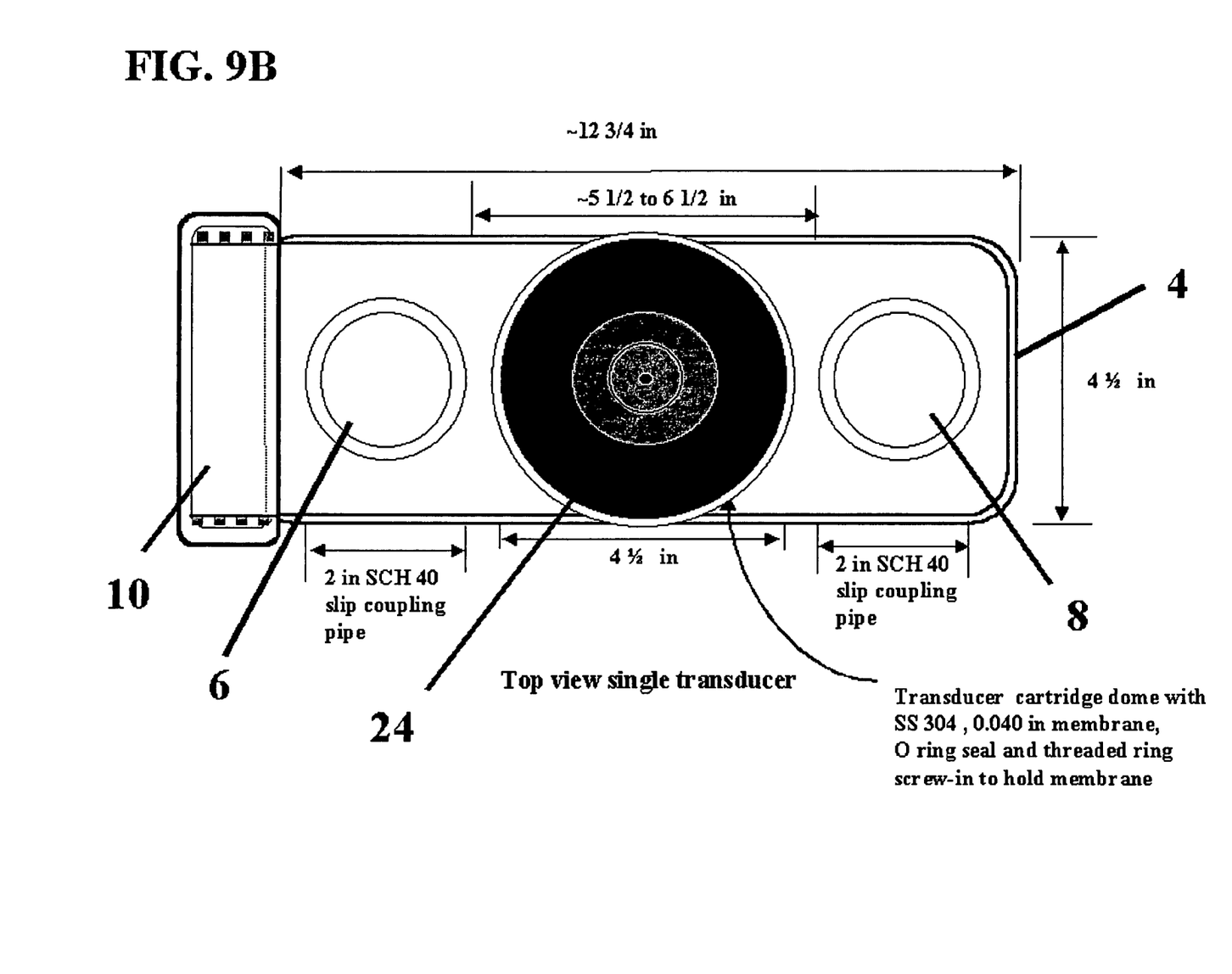

(c) FIGS. 9A-9B show respective side and top views of a single transducer version of the present invention in which the electronics for the transducer have been included within the devices' container.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Thus, there are a large number of possible operational configurations and material selections available to achieve the electrode cleaning operation described herein. For example, a specific embodiment of the present invention can be altered by changing considerations of: manufacturing costs, esthetic appeal of the apparatus, cell electrode size requirements, water pumping requirements, etc.

Therefore, the foregoing is considered as illustrative only of the principles of the present invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as hereinafter set forth in the claims.

I claim:

1. An ultrasonic cleaning device for cleaning and removal of mineral deposits on one or more submerged electrodes of a device containing the one or more electrodes, the electrode containing device comprising a housing having an inlet port and an outlet port for allowing a flow of fluid to pass through the housing and over the one or more submerged electrodes, the ultrasonic cleaning device comprising:

a flexible membrane soft coupled with respect to the housing and covering an aperture in the housing, a first side of the membrane in contact with the fluid in the housing and a second side opposite the first side and not in contact with the fluid in the housing; and an ultrasonic transducer operatively coupled to the second side of the membrane, and not directly connected to the housing, to cause ultrasonic vibrations in the membrane and flexing of the membrane for generating and projecting ultrasonic waves in the fluid directed at the one or more submerged electrodes.

2. The ultrasonic cleaning device of claim 1, further comprising:

a container connected to and extending from the housing;

an opening in the container, the container opening mating with and covering the housing aperture;

the membrane disposed between the housing and the container at the intersection of the container opening and the housing aperture; and the ultrasonic transducer disposed in the container and isolated from fluid in the housing by the membrane.

3. The ultrasonic cleaning device of claim 1, wherein the membrane and ultrasonic transducer project ultrasound over substantially the full volume of the submerged electrodes.

4. The ultrasonic cleaning device of claim 1, further comprising creeping acoustical stress waves created via the ultrasonic waves along the surface of the one or more submerged electrodes.

5. The ultrasonic cleaning device of claim 1, further comprising localized cavitation near the surface of the one or more submerged electrodes created by the ultrasonic waves.

6. The ultrasonic cleaning device of claim 1, further comprising a frequency modulated power source that drives the ultrasonic transducer.

7. The ultrasonic cleaning device of claim 1, further comprising a frequency modulated power source with frequencies in the range of about 20 to about 50 kHz.

8. The ultrasonic cleaning device of claim 7, wherein the ultrasonic transducer is configured so as to operate at controlled power levels in the range of about 50 to about 300 watts.

9. The ultrasonic cleaning device of claim 8, wherein the membrane configured to operate at energy flux levels in the range of about 4 to about 25 watts per square inch of membrane surface area.

10. The ultrasonic cleaning device of claim 7, further comprising a sensor that senses the transmitted power to the electrode and uses the sensed power to control the operation of the transducer power supply.

11. The ultrasonic cleaning device of claim 1, wherein the ultrasonic transducer is centrally located with respect to the membrane and does not extend to an edge of the membrane, the ultrasonic transducer being free floating on the membrane and is not connected to the housing.

12. The ultrasonic cleaning device of claim 11, wherein the membrane edge is soft coupled to the housing proximate the aperture.

13. The ultrasonic cleaning device of claim 1, wherein the ultrasonic transducer comprises a high power ultrasonic or piezoelectric driver.

14. The ultrasonic cleaning device of claim 1, further comprising more than one ultrasonic transducer positioned and powered to generate an insonification zone that covers a larger volume of submerged electrodes.

15. The ultrasonic cleaning device of claim 1, further comprising a power source programmed to provide continuous lower power insonification for inhibiting mineral deposits and intermittent higher power levels for the cleaning and removal of mineral deposits.

16. The ultrasonic cleaning device of claim 1, wherein the device housing the one or more submerged electrodes comprises a salt water chlorination system.

17. The ultrasonic cleaning device of claim 16, wherein the salt water chlorination system comprises a pool chlorinator cell and the one or more electrodes comprise active chlorination electrodes used for salt water pool treatment.

18. The ultrasonic cleaning device of claim 17, wherein the ultrasonic cleaning device is retrofit into an existing pool chlorinator cell.

19. The ultrasonic cleaning device of claim 1, further comprising gas bubbles generated by the one or more electrodes, wherein the gas bubbles are dynamically excited, enlarged or collapsed by the ultrasonic waves, the dynamically excited gas bubbles providing further dynamical disturbances in the proximity of the surface of the one or more submerged electrodes.

20. The ultrasonic cleaning device of claim 1, wherein the membrane comprises a metal material or a plastic material.

21. The ultrasonic cleaning device of claim 1, wherein the container housing the ultrasonic device comprises an RF shielded container, the ultrasonic device located adjacent to and on an exterior side of the membrane, the membrane being incorporated into the housing in fluid communication with the fluid flowing through the housing, the membrane couples and radiates sound energy generated by the ultrasonic device into the fluid flowing through the housing towards the one or more submerged electrodes.

22. The ultrasonic cleaning device of claim 1, wherein the ultrasonic cleaning device is located on one of a bottom or side of the housing.

23. The ultrasonic cleaning device of claim 1, further comprising one or more sensors attached to the housing, an output of the one or more sensors being used to control a power supply of the ultrasonic transducer.

24. The ultrasonic cleaning device of claim 23, further comprising an electronic control assembly comprising a transducer driver and controller, the electronic control assembly receiving the output from the one or more sensors to control an operation of the ultrasonic transducer.

25. The ultrasonic cleaning device of claim 24, further comprising:
   a container connected to and extending from the housing and covering the housing aperture;
   the membrane disposed between the housing and the container; and
   the ultrasonic transducer disposed in the container and isolated from fluid in the housing by the membrane;
   wherein the electronic control assembly is located in the container.

26. The ultrasonic cleaning device of claim 24, wherein the electronic control assembly is a remote controller separate from the container.

27. A system for inhibition, control, and removal of mineral deposits on the surface of electrodes in salt water chlorination systems comprising:
   a chlorinator cell comprising:
      a housing having a housing internal cavity that may be pressurized with a fluid;
      one or more electrodes disposed in the housing internal cavity of the housing;
      an inlet port connecting a fluid supply to the housing internal cavity;
      an outlet port connecting the housing internal cavity to a fluid discharge;
      an aperture in a wall of the housing;
   an ultrasonic device comprising:
      a container extending from the housing and defining a container internal cavity;
      an opening in the container, the container opening aligned with and covering the housing aperture;
      a flexible membrane disposed between the housing aperture and the container opening, an edge of the membrane forming a soft termination of the membrane with the housing or container, the membrane sealing the housing aperture; and
      an ultrasonic transducer disposed in the container internal cavity and coupled to the membrane, the membrane isolating the ultrasonic transducer from the fluid flowing through the internal cavity of the chlorinator cell housing;
   wherein operation of the ultrasonic transducer coupled to the membrane causes the membrane to flex and act as an ultrasonic radiator that produces controlled ultrasonic waves that radiate from the membrane toward the one or more electrodes to inhibit, control, or remove deposition of mineral materials that are extracted from the fluid during the electrolysis process of the chlorinator cell.

28. The system of claim 27, wherein the ultrasonic device is a retrofit ultrasonic device that is integrated into an existing chlorinator cell that is modified to include the aperture and to receive the ultrasonic device.

29. The system of claim 27, further comprising a controller that controls the power to the ultrasonic transducer to create the ultrasonic waves of a uniform acoustic field at predetermined frequency and at predetermined wave-front shape that produced uniform and non-damaging cavitations proximate the surfaces of the one or more electrodes.

30. The system of claim 29, wherein the controller further controls operation of the ultrasonic transducer to ensure that the ultrasonic waves generated and radiated from the membrane dynamically interact with bubbles generated during the electrolysis process, which creates creeping waves over the surfaces of the electrodes that further inhibit the deposition of minerals on the surfaces of the one or more electrodes.

31. The system of claim 27, wherein the ultrasonic device comprises a high power ultrasonic or piezoelectric driver transducer.

32. The system of claim 27, wherein the ultrasonic transducer and membrane are located such that the produced ultrasonic waves that radiate from the membrane are normal to an edge of the one or more electrodes to allow the ultrasonic waves to travel between adjacent electrodes and create creeping waves over the surfaces of the electrodes.

33. The system of claim 27, wherein the ultrasonic transducer frequency, cell aperture size, and membrane size are predetermined to substantially ensure insonification of the electrodes.

34. The system of claim 27, wherein one or more of: number, location and parameters of the ultrasonic transducer and membrane are determined to substantially ensure insonification of the electrodes.

35. The combination of a water chlorination device and an ultrasonic cleaning device, the combination comprising:
    a water chlorination device comprising:
        a housing for receiving a flow of pressurized water;
        one or more apertures in a bottom and/or side wall(s) of the housing;
        one or more electrodes disposed in the housing, said electrodes being submerged in the flowing water during operation of the water chlorination device;
    one or more ultrasonic cleaning devices, each ultrasonic cleaning device comprising:
        a container having an opening at one end that corresponds with an aperture in the housing;
        a flexible membrane disposed between the opening and the aperture and that covers the aperture to seal the water in the housing, an edge of the membrane forming a soft termination between the flexible ultrasonic membrane and the housing;
        one or more ultrasonic transducers disposed in the container and operatively coupled to the membrane, the ultrasonic transducer being free standing on the membrane so that the ultrasonic transducer is not in direct contact with the housing;
        a frequency modulated power source that drives the ultrasonic transducer;
        a controller to control the frequency of the ultrasonic transducer in the range between about 20 to about 50 kHz and to control the power levels of the ultrasonic transducer in the range between 50 and 300 watts;
        wherein the controlled ultrasonic transducer causes ultrasonic vibrations in the membrane which in turn generates and projects ultrasonic waves in the water directed to the one or more electrodes to inhibit, control, or remove mineral deposits on surfaces of the one or more electrodes during operation of the water chlorinator device via:
            the ultrasonic waves projected substantially the full volume of the one or more submerged electrodes;
            creeping acoustical stress waves along the surface of the one or more submerged electrodes; and
            localized cavitation near the surface of the one or more submerged electrodes;
    wherein the size and shape of the water chlorinator housing, and the size, location, and number of ultrasonic cleaning device(s) ensures ultrasonic waves are projected over substantially the full volume of the submerged electrodes.

* * * * *